United States Patent
Zhao

(10) Patent No.: US 11,014,665 B2
(45) Date of Patent: May 25, 2021

(54) UNMANNED AERIAL VEHICLE-BASED EXTERNAL WALL SPRAY PRINTING SYSTEM AND SPRAYING METHOD THEREOF

(71) Applicant: GUANGDONG YINYANG ENVIRONMENT-FRIENDLY NEW MATERIALS CO., LTD., Foshan (CN)

(72) Inventor: Zhihui Zhao, Foshan (CN)

(73) Assignee: GUANGDONG YINYANG ENVIRONMENT-FRIENDLY NEW MATERIALS CO., LTD., Foshan (CN)

( * ) Notice: Subject to any disclaimer, the term of this patent is extended or adjusted under 35 U.S.C. 154(b) by 268 days.

(21) Appl. No.: 16/064,211

(22) PCT Filed: Sep. 7, 2016

(86) PCT No.: PCT/CN2016/098274
§ 371 (c)(1),
(2) Date: Jun. 20, 2018

(87) PCT Pub. No.: WO2018/023854
PCT Pub. Date: Feb. 8, 2018

(65) Prior Publication Data
US 2019/0002100 A1    Jan. 3, 2019

(30) Foreign Application Priority Data
Aug. 5, 2016  (CN) .......................... 201610637630.9

(51) Int. Cl.
*B64C 39/02*  (2006.01)
*B05B 12/08*  (2006.01)
(Continued)

(52) U.S. Cl.
CPC .............. *B64C 39/02* (2013.01); *B05B 12/08* (2013.01); *B05B 12/12* (2013.01); *B05B 13/005* (2013.01); *B64D 1/18* (2013.01); *B64C 2201/12* (2013.01)

(58) Field of Classification Search
CPC .......... B64D 1/18; B64D 47/08; B64D 45/00; B64D 47/00; B64D 47/02; B64D 27/24;
(Continued)

(56) References Cited

U.S. PATENT DOCUMENTS

| 6,299,934 B1 | 10/2001 | Manning | |
| 2015/0274294 A1* | 10/2015 | Dahlstrom | B05B 13/0278 239/722 |

(Continued)

FOREIGN PATENT DOCUMENTS

| CN | 203620847 U | 6/2014 |
| CN | 204507277 U | 7/2015 |

(Continued)

OTHER PUBLICATIONS

The World Intellectual Property Organization (WIPO) Nternational Search Report for PCT/CN2016/098274 dated May 4, 2017 6 Pages.

*Primary Examiner* — Tuan C To
*Assistant Examiner* — Paul A Castro
(74) *Attorney, Agent, or Firm* — Anova Law Group, PLLC

(57) ABSTRACT

A UAV-based external wall spray printing system and a spraying method thereof, wherein a spray nozzle is disposed on the UAV. The method comprises: A. controlling a UAV to fly along edges of an external wall, and measure an area to be sprayed; B. calculating a spray trajectory for a pattern, before acquiring various positioning coordinates, establishing corresponding relationships between the coordinates and
(Continued)

spray feature data; C. controlling the UAV to fly to positions of the area according to the respective coordinates of the spray trajectory, and calling the corresponding spray feature data to control the nozzle to spray a coating material, thus completing spraying the pattern. The spray printing system and method can rapidly spray and print an advertisement on a wall by using a UAV, thereby reducing the labor intensity and construction difficulty for construction workers.

9 Claims, 1 Drawing Sheet

(51) Int. Cl.
  *B05B 12/12* (2006.01)
  *B05B 13/00* (2006.01)
  *B64D 1/18* (2006.01)
(58) Field of Classification Search
  CPC ..... B05B 13/005; B05B 9/0403; B05B 12/08; B05B 12/124; B05B 12/122; B05B 12/14; B05B 9/007; B05B 12/12; B05B 15/62; B05B 1/3006; B05B 12/16; B05B 15/00; G06T 2207/30108; G06T 7/0004; G06T 7/30; G06T 7/40; G06T 17/00; G06T 7/73; B64C 2201/12; B64C 39/024; B64C 2201/027; B64C 39/02; B64C 2201/123; B64C 2201/126; B64C 2201/145; B64C 27/04

See application file for complete search history.

(56) References Cited

U.S. PATENT DOCUMENTS

| | | | |
|---|---|---|---|
| 2015/0344136 A1* | 12/2015 | Dahlstrom | B64C 39/024 701/3 |
| 2016/0047895 A1* | 2/2016 | Dussan | G01S 17/89 356/4.01 |
| 2016/0082460 A1 | 3/2016 | McMaster et al. | |
| 2017/0305550 A1* | 10/2017 | Whitmarsh | B64D 1/18 |

FOREIGN PATENT DOCUMENTS

| | | | |
|---|---|---|---|
| CN | 105649310 A | 6/2016 | |
| EP | 1293804 A1 * | 3/2003 | G01S 17/89 |

* cited by examiner

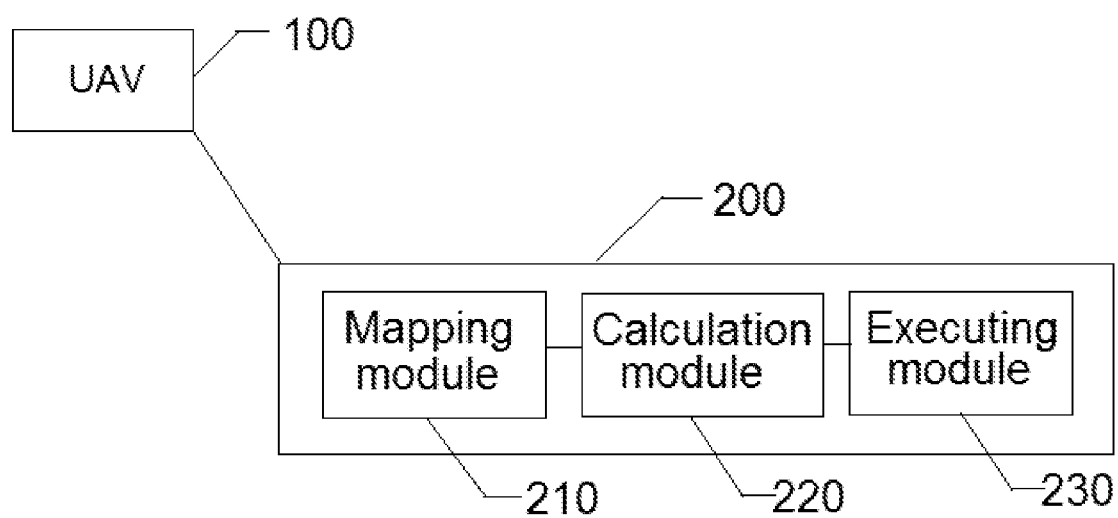

UNMANNED AERIAL VEHICLE-BASED EXTERNAL WALL SPRAY PRINTING SYSTEM AND SPRAYING METHOD THEREOF

CROSS-REFERENCES TO RELATED APPLICATIONS

This application is a national stage application of PCT Patent Application No. PCT/CN 2016/098274, filed on Sep. 7, 2016, which claims priority to Chinese Patent Application No. 201610637630.9, filed on Aug. 5, 2016, the content of all of which is incorporated herein by reference.

FIELD OF THE INVENTION

The present invention relates to the field of spraying technologies, and more particularly, to an unmanned aerial vehicle-based external wall spray printing system and a spraying method thereof.

BACKGROUND

Currently there are mainly two methods applied for an implementation form of a wall advertisement, including a method of spray painting and a method of displaying, wherein a method of adopting an electronic screen hanging on a wall to display an advertisement owns a plurality of advantages of having a rich content and an inexpensive replacement of advertisements, however, it also owns a plurality of drawbacks, including a high cost of purchasing and maintaining an electronic screen, and the high cost of purchasing and maintaining has greatly affected an application of such a wall advertisement form, thus adopting a method of spray printing for the wall advertisement has been more and more favored by a plurality of advertisers, due to a plurality of characters including a simple spray painting and a low price thereof. However, in the prior art, since the wall advertisement finished by the method of spray painting is mainly achieved by an artificial spray painting on a wall, thus when preparing a huge wall advertisement by spray painting, or when preparing a wall advertisement on a high building by spray painting, a construction of spray painting will face a plurality of problems, including a pretty difficult construction on spray painting a pattern, and a pretty heavy labor intensity for a construction worker, which makes a large scale wall advertisement hard to be achieved by spray painting, which has also greatly blocked a development of the wall advertisement achieved by spray painting.

Therefore, the current technology needs to be improved and developed.

BRIEF SUMMARY OF THE DISCLOSURE

According to the above described defects, the purpose of the present invention is providing an unmanned aerial vehicle (UAV)-based external wall spray printing system and a spraying method thereof, in order to solve a problem of a large scale wall advertisement hard to be achieved by spray printing.

In order to achieve the above mentioned goals, the technical solution of the present invention to solve the technical problems is as follows:

A UAV-based external wall spraying method, wherein the UAV has a spray nozzle disposed, applied to spray printing a coating material, the method includes:

A. controlling a UAV to fly along a plurality of edges of an external wall, before measuring an area to-be-sprayed according to a flight trajectory of the UAV;

B. using a measured area to-be-sprayed to calculate a spray trajectory for a pattern to-be-sprayed on the area to-be-sprayed, before acquiring various positioning coordinates on the spray trajectory, and establishing a corresponding relationship between the various positioning coordinates and a plurality of spray feature data based on the pattern to-be-sprayed;

C. controlling the UAV to fly to a plurality of positions of the area to-be-sprayed in accordance with the positioning coordinates of the spray trajectory respectively and orderly, before calling the spray feature data corresponding to each of the positioning coordinates and controlling the nozzle to spray the coating material, thus completing spraying the pattern.

The UAV-based external wall spraying method, wherein the UAV has a height measurement device and a satellite positioning device arranged, the step A contains specifically: starting and controlling the UAV to fly a whole circle along the edges of the external wall to be worked, obtaining a flight trajectory of the UAV along the edges of the external wall, and obtaining a plurality of coordinate data on the flight trajectory through the height measurement device and the satellite positioning device arranged inside the UAV, before calculating, mapping a plurality of coordinate data according to the area to-be-sprayed;

The UAV-based external wall spraying method, wherein the UAV has a camera arranged, when the UAV starts to fly along the edges of the external wall, the camera captures a plurality of pictures of the edges of the external wall present, by analyzing a contrast value of the pictures of the edges of the present external wall and comparing to a preset range of contrast value, the UAV is controlled automatically flying along the edges of the external wall, following a result of the comparison.

The UAV-based external wall spraying method, wherein the UAV has a laser range finder arranged, and through a plurality of data measured in a real-time by the laser range finder, the UAV is controlled to keep always a preset distance away from a face of the external wall during a whole process of the flight.

The UAV-based external wall spraying method, wherein the spray feature data includes a spray color, a paint viscosity, and a spray direction of the nozzle.

The UAV-based external wall spraying method, wherein the step B contains specifically:

B1. setting the pattern to-be-sprayed on the area to-be-sprayed according to a preset size, mapping a spray trajectory based on the area occupied by the pattern to-be-sprayed, followed by obtaining each of the positioning coordinates belonging to the spray trajectory.

B2. presetting the spray feature data on each positioning point of the pattern to-be-sprayed, and establishing a one-to-one correspondence between each of the positioning coordinates on the spray trajectory and each of the positioning points of the preset pattern to-be-sprayed, before establishing the spray feature data of each of the positioning coordinates on the spray trajectory.

The UAV-based external wall spraying method, wherein the step C contains specifically:

C1. Controlling the UAV to fly to a plurality of predetermined positions in the area to-be-sprayed orderly by using each of the positioning coordinates of the spray trajectory.

C2. Searching for the spray feature data corresponding to the positioning coordinate that the UAV locates, and using the spray feature data to control the nozzle to spray the coating material, before completing spraying the pattern.

The UAV-based external wall spraying method, wherein the UAV has a temperature and humidity detection device arranged, and the spray feature data of each of the positioning coordinates on the spray trajectory are modified based on a real-time detection data from the temperature and humidity detection device.

A UAV-based external wall spray printing system, wherein the system comprises the UAV and a control center applied to controlling the UAV, the control center comprises:

a mapping module: applied to controlling the UAV to fly along the edges of the wall, mapping the area to-be-painted according to a measurement of a flight trajectory of the UAV.

a calculation module: applied to using a measured area to-be-sprayed to calculate a spray trajectory for a pattern to-be-sprayed on the area to-be-sprayed, before acquiring various positioning coordinates on the spray trajectory, and establishing a corresponding relationship between the various positioning coordinates and a plurality of spray feature data based on the pattern to-be-sprayed;

an executing module: applied to controlling the UAV to fly to a plurality of positions of the area to-be-sprayed in accordance with the positioning coordinates of the spray trajectory respectively and orderly, before calling the spray feature data corresponding to each of the positioning coordinates and controlling the nozzle to spray the coating material, thus completing spraying the pattern.

Benefits: The present invention provides a UAV-based external wall spray printing system and a spraying method thereof, through the present system, it is possible to use a UAV to quickly spray printing a wall advertisement, the pattern is vivid with less errors. And comparing to a wall spray painting scheme in prior art, the present invention owns a simple and easy method, with a low construction cost, which has greatly reduced a labor intensity of a construction worker and construction difficulty, which also makes a large wall advertisement possible to achieve, having a broad market prospect.

BRIEF DESCRIPTION OF THE DRAWINGS

FIG. 1 illustrates a schematic block diagram of an external wall spray printing system according to an embodiment of the present invention;

DETAILED DESCRIPTION OF EMBODIMENTS

The present invention provides a UAV-based external wall spray printing system and a spraying method thereof. In order to make the purpose, technical solution and the advantages of the present invention clearer and more explicit, further detailed descriptions of the present invention are stated here, referencing to the attached drawing and some preferred embodiments of the present invention. It should be understood that the detailed embodiments of the invention described here are used to explain the present invention only, instead of limiting the present invention.

The present invention provides a UAV-based external wall spray printing method, wherein, the UAV has a spray nozzle disposed, applied to spray printing a coating material, and the UAV is controlled by a control center set on the ground, the method is:

S1. Controlling a UAV to fly along a plurality of edges of an external wall, before mapping an area to-be-sprayed according to a flight trajectory of the UAV.

For the external wall to be patterned, it is required to make a mapping first to obtain a "digital map" of a surface of the wall, and the present invention uses a UAV to complete this process, thereby there is no need for any additional mapping devices, and a UAV mapping may be adapted to various wall surfaces, which has greatly expanded an application range of the system described in the present invention. Specifically, the UAV has a height measurement device and a satellite positioning device arranged, that is, for example, if a UAV has an altimeter and a GPS module arranged, then a step described above is specifically: starting a UAV and controlling the UAV to fly a whole circle along a plurality of edges of an external wall to be worked, before obtaining a flight trajectory of the UAV along the edges of the external wall, and obtaining a plurality of coordinate data of the flight trajectory through the height measurement device and the satellite positioning device arranged in the UAV, followed by calculating, measuring and mapping a plurality of coordinate data of the area to-be-sprayed by using the plurality of coordinate data of the flight trajectory. A process of mapping may be carried out either automatically or manually. After determining the external wall to be patterned, the UAV is controlled to fly along the edges of the external wall, and feeds a plurality of measured data back to a control center; the data feedback includes at least a real-time altitude data and a real-time positioning data. It is able to finish measuring a scope of the area to-be-sprayed based on a whole flight trajectory of the UAV during the process of mapping, followed by calculating and obtaining a positioning coordinate of the area to-be-sprayed by using the flight trajectory of the UAV during mapping.

The UAV is able to finish the process of mapping automatically, specifically, the UAV has a camera arranged, when the UAV starts to fly along the edges of the external wall, the camera captures a plurality of pictures of the edges of the present external wall, by analyzing a contrast value of the pictures of the edges of the present external wall, before comparing to a preset range of contrast value, the UAV is then controlled automatically flying along the edges of the external wall, through a result of comparison. The contrast value preset is able to be achieved by calculating the contrast values of the edges of the external wall obtained by a ground camera before mapping. When the camera in the UAV has captured a plurality of pictures of the edges of the external wall, the control center will process the pictures, if a contrast value difference is obvious on a boundary of the edges of the external wall, then such a contrast value difference may help the control center determine that a current position of the UAV locating is the edge of the external wall, and the control center will control the UAV to fly upward vertically; and if the pictures captured by the camera in the UAV has no matched contrast value difference appeared, that means the UAV currently has deviated from the edges of the wall, then the UAV will be controlled to move left and right a predetermined distance, until a matched image is reacquired, then the UAV is controlled to resume executing a same instruction as a previous control instruction. For example, when the control center calculates and analyzes that there is no matched contrast value difference in the images of the UAV currently recorded, then the UAV is controlled to fly left for a predetermined distance, and if there is still no pictures having a matched contrast value difference obtained at this time, the UAV is then controlled to fly right for a predetermined distance. And if now a picture having a matched contrast value difference is obtained, then that means the UAV has reached a corner of the external wall, and a next step is continuing controlling the UAV to continue flying to right. Obtaining a picture having a matched contrast difference means the edges of the external wall resuming to the right after the corner.

If the UAV is still not able to obtain pictures with a matched contrast value difference after flying up, down, left, and right at a certain position, that may be a system failure or an abnormal contrast of the wall at this position, then the control center will issue an alarm and the UAV will be manually controlled by a construction personnel to fly over this position.

In the present invention, a self-checking process is set after the UAV is started, that is, after the UAV is started, a working condition of each device in the UAV is first determined under a control of the control center, to ensure a normal operation of the UAV, for example, testing whether the height measurement device and the satellite positioning device are able to work normally, and testing if the nozzle in the UAV may complete the spraying with a corresponding spraying direction and a paint with a corresponding color according to a control instruction.

S2. using a mapped area to-be-sprayed to calculate a spray trajectory for a pattern to-be-sprayed on the area to-be-sprayed, before acquiring various positioning coordinates on the spray trajectory, and establishing a corresponding relationship between the various positioning coordinates and a plurality of spray feature data based on the pattern to-be-sprayed.

Further, the step described above is specifically:

S21. setting the pattern to-be-sprayed on the area to-be-sprayed according to a preset size, mapping a spray trajectory based on the area occupied by the pattern to-be-sprayed, followed by obtaining each of the positioning coordinates belonging to the spray trajectory.

The control center sets the input pattern to-be-sprayed to the area to-be-sprayed which is obtained by mapping, and determines a position of the pattern to-be-sprayed on the area to-be-sprayed according to a preset size and position. While based on the pattern to-be-sprayed, it is possible to obtain the spray trajectory, followed by each of the positioning coordinates of the spray trajectory.

Preferably, since there are a plurality of obstacles or protrusions including some windows or decorative barriers in some of the external walls, then it is needed to ensure a positioning coordinate of the obstacles or protrusions in the area to-be-sprayed. That may be achieved by the UAV mapping and obtaining the positioning coordinates of the obstacles or protrusions, followed by determining the positioning coordinates of the obstacles or protrusions in the area to-be-sprayed, while the spray trajectory is adjusted according to the positioning coordinates of the obstacles or protrusions, for example, it is set that in the spray trajectory, when crossing a position of an obstacle or a protrusion, the UAV stops spraying and cross the corresponding positions directly.

S22. presetting the spray feature data on each positioning point of the pattern to-be-sprayed, and establishing a one-to-one correspondence relationship between each of the positioning coordinates on the spray trajectory and each of the positioning points of the preset pattern to-be-sprayed, before establishing the spray feature data of each of the positioning coordinates on the spray trajectory.

Wherein, the spray feature data includes a spray color, a paint viscosity, and a spray direction of the nozzle. The nozzle of the UAV connects with a material barrel set on the ground through a material pipe. The paint in the barrel is mixed by a premixing device before entering the nozzle along the material pipe, and sprayed by the nozzle onto the wall to form a pattern. The barrels are set to be three, each is respectively contained with one of three primary color paints, red, green and blue as three colors, while all colors contained in the pattern to-be-spray may be obtained by blending the three primary color paints in the three barrels in a different proportion, wherein the premixing device is connected to and controlled by the control center, after determining the position and size of the pattern to-be-sprayed, it is possible to determine the coordinates of each position point covered by the pattern to-be-sprayed, and based on that, the spray feature data on each position point is set, since each of the positioning coordinates on the spray trajectory has a correspondence relationship with each position point covered by the pattern to-be-sprayed, thus the spray feature data corresponding to each positioning coordinate of the spray trajectory is obtained.

The coating paint used in the system described in the present invention has a characteristic of a large viscosity and a fast curing, while having a characteristic of not easy clogging the nozzle.

The coating material is composed by a plurality of following components in certain fractions:

| | |
|---|---|
| water | 25-35 servings |
| dispersing agent | 0.3-0.6 servings |
| AMP95 | 0.1-0.3 servings |
| leveling agent | 0.3-0.5 servings |
| wetting agent | 0.1-0.3 servings |
| internal and external wall spray coating emulsion | 40-50 servings |
| environmentally-friendly low VOC filming additives | 1-3 servings |
| rutile titanium dioxide | 20-30 servings |
| heavy calcium powder (400 mesh) | 10-20 servings |
| hydroxyethyl cellulose (HBR250) | 0.2-0.4 servings |
| PEG(400) | 2-4 servings |
| defoamer | 0.1-0.3 servings |

S3. controlling the UAV to fly to each of the positions of the area to-be-sprayed in accordance with the positioning coordinates of the spray trajectory respectively and orderly, before calling the spray feature data corresponding to each of the positioning coordinates and controlling the nozzle to spray the coating material, thus completing spraying the pattern.

Further, the UAV has a laser range finder arranged, and through a plurality of data measured in a real-time by the laser range finder, the UAV is controlled to keep always a preset distance away from a face of the external wall during a whole process of the flight. In the present invention, since the system adopts the UAV to spray the pattern directly to the external wall, thus the coating material is specially prepared, and a distance between the nozzle and the UAV must also be controlled strictly to ensure a quality of the spray. The UAV keeps the distance between the UAV and the wall in a preset range during a flight process through the laser range finder.

The steps described above are specifically:

S31. Controlling the UAV to fly to a plurality of predetermined positions in the area to-be-sprayed orderly by using each of the positioning coordinates of the spray trajectory.

S32. Searching for the spray feature data corresponding to the positioning coordinate that the UAV locates, the control center uses the spray feature data according to the positioning coordinate, and based on the data, controls the premixing device to mix the three primary colors coating materials in a certain proportion to achieve the coating material with the required color, followed by controlling the nozzle to spray the coating material according to the spray feature data, before finally completing spraying the pattern.

Additionally, the UAV has a temperature and humidity detection device arranged, and the spray feature data of each of the positioning coordinates on the spray trajectory are modified based on a real-time detection data from the temperature and humidity detection device. That is, the spray feature data corresponding to each of the positioning coordinates is not always a constant, since a huge wall advertisement has a large work space, and a long work time, a plurality of environmental factors have a pretty large effect on the coating materials and the system work, by arranging the temperature and humidity detection device in the UAV to real-time detect a temperature and humidity data of the environment, and based on the temperature and humidity data, the control center feeds back and adjust preparing the coating materials, that is, through the premixing device (with an auxiliary adding unit), adjusting a viscosity and curing characteristic of the coating material by changing an additive ratio of an additive and a solvent, so that the coating material is able to adapt to changes in the operation environment, so that the spraying operation may be completed successfully.

The present invention further provides a UAV-based external wall spray printing system, wherein, the system comprises a UAV 100 and a control center 200 controlling the UAV, the control center 200 includes:

a mapping module 210: applied to controlling the UAV 100 to fly along the edges of the wall, mapping the area to-be-painted according to a measurement of a flight trajectory of the UAV 100.

a calculation module 220: applied to using a measured area to-be-sprayed to calculate a spray trajectory for a pattern to-be-sprayed on the area to-be-sprayed, before acquiring various positioning coordinates on the spray trajectory, and establishing a corresponding relationship between the various positioning coordinates and a plurality of spray feature data based on the pattern to-be-sprayed;

an executing module 230: applied to controlling the UAV 100 to fly to a plurality of positions of the area to-be-sprayed in accordance with the positioning coordinates of the spray trajectory respectively and orderly, before calling the spray feature data corresponding to each of the positioning coordinates and controlling the nozzle to spray the coating material, thus completing spraying the pattern.

The present invention provides a UAV-based external wall spray printing system and a spraying method thereof, through the present system, it is possible to use a UAV to quickly spray printing a wall advertisement, the pattern is vivid with less errors. And comparing to a wall spray painting scheme in prior art, the present invention owns a simple and easy method, with a low construction cost, which has greatly reduced a labor intensity of a construction worker and construction difficulty, which also makes a large wall advertisement possible to achieve, having a broad market prospect.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A UAV-based external wall automatic spraying method, wherein the UAV has a camera, a spray nozzle disposed, applied to spray painting a coating material, the method includes:

A. controlling a UAV to fly along a plurality of edges of an external wall and the camera to capture a plurality of pictures of the edges of the external wall, obtaining a matched picture by obtaining a contrast value of the pictures of the edges matching a predetermined contrast value;

issuing an alarm and aborting the automatic spraying method in response to a failure of obtaining the matched picture;

mapping an area to-be-sprayed according to a flight trajectory of the UAV;

B. using the mapped area to-be-sprayed to calculate a spray trajectory for a pattern to-be-sprayed on the area to-be-sprayed, before acquiring various positioning coordinates corresponding to positioning points on the spray trajectory;

C. presetting a plurality of spray feature data on each of the positioning points of the pattern to-be-sprayed, establishing a corresponding relationship between the various positioning coordinates and the plurality of spray feature data based on the pattern to-be-sprayed, wherein the spray feature data includes at least a spray color;

D. calling the spray feature data corresponding to each of the positioning coordinates, controlling the UAV to fly to a plurality of positions of the area to-be-sprayed in accordance with the positioning coordinates of the spray trajectory respectively and orderly and controlling supply of three primary colors of the coating material according to the pattern to-be-sprayed, and controlling the nozzle to spray the coating material, thus completing spraying the pattern.

2. The method according to claim 1, wherein the UAV has a height measurement device and a satellite positioning device, and the step A comprises specifically: starting and controlling the UAV to fly along the edges of the external wall to be worked, obtaining a flight trajectory of the UAV along the edges of the external wall, and obtaining a plurality of coordinate data on the flight trajectory through the height measurement device and the satellite positioning device arranged inside the UAV.

3. The method according to claim 1, wherein mapping the area to be sprayed further includes analyzing a contrast value of the pictures of the edges of the external wall present and comparing to a preset range of contrast value, the UAV is controlled automatically flying along the edges of the external wall, following a result of the comparison.

4. The method according to claim 1, wherein the UAV has a laser range finder arranged, and through a plurality of data measured in a real-time by the laser range finder, the UAV is controlled to keep always a preset distance away from a face of the external wall during a whole process of the flight.

5. The method according to claim 1, wherein the spray feature data includes the spray color, a paint viscosity, and a spray direction of the nozzle.

6. The method according to claim 5, wherein the step B contains specifically:

B1. setting the pattern to-be-sprayed on the area to-be-sprayed according to a preset size, mapping a spray trajectory based on the area occupied by the pattern to-be-sprayed, followed by obtaining each of the positioning coordinates belonging to the spray trajectory;

B2. presetting the spray feature data on each positioning point of the pattern to-be-sprayed, and establishing a one-to-one correspondence relationship between each of the positioning coordinates on the spray trajectory and each of the positioning points of the preset pattern to-be-sprayed, before establishing the spray feature data of each of the positioning coordinates on the spray trajectory.

7. The method according to claim 5, wherein the step C contains specifically:
   C1. Controlling the UAV to fly to a plurality of predetermined positions in the area to-be-sprayed orderly by using each of the positioning coordinates of the spray trajectory;
   C2. Searching for the spray feature data corresponding to the positioning coordinate that the UAV locates, and using the spray feature data to control the nozzle to spray the coating material.

8. The method according to claim 5, wherein the UAV has a temperature and humidity detection device arranged, and the spray feature data of each of the positioning coordinates on the spray trajectory are modified based on a real-time detection data from the temperature and humidity detection device.

9. A UAV-based external wall automatic spray printing system, wherein the system comprises the UAV, a camera, and a control center for controlling the UAV, the control center configured to:
   map the area to-be-painted according to a measurement of a flight trajectory of the UAV by controlling the UAV to fly along the edges of the wall and controlling the camera to capture a plurality of pictures of the edges of the external wall, and by obtaining a matched picture by a contrast value of the pictures of the edges matching a predetermined contrast value, and in response to a failure of obtaining the matched picture, to issue an alarm and stopping the automatic spray printing system;
   calculate a spray trajectory for a pattern to-be-sprayed on the area to-be-painted by acquiring various positioning coordinates corresponding to positioning points on the spray trajectory, presetting a plurality of spray feature data on each of the positioning points of the pattern to-be-sprayed, and establishing a corresponding relationship between the various positioning coordinates and the plurality of spray feature data based on the pattern to-be-sprayed, wherein the spray feature data includes at least a spray color;
   by calling the spray feature data corresponding to each of the positioning coordinates, control the UAV to fly to a plurality of positions of the area to-be-sprayed in accordance with the positioning coordinates of the spray trajectory respectively and orderly, and control supply of at least three primary colors of the coating material according to the pattern to-be-sprayed, and control the nozzle to spray the coating material, thus to complete spraying the pattern.

* * * * *